(12) United States Patent
Hisada et al.

(10) Patent No.: US 11,158,962 B2
(45) Date of Patent: Oct. 26, 2021

(54) TERMINAL COVER

(71) Applicant: DENSO CORPORATION, Kariya (JP)

(72) Inventors: Motohide Hisada, Kariya (JP); Shinji Ando, Kariya (JP); Toshioki Iwai, Kariya (JP); Shinichi Sugiyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 31 days.

(21) Appl. No.: 16/800,119

(22) Filed: Feb. 25, 2020

(65) Prior Publication Data

US 2020/0274260 A1 Aug. 27, 2020

(30) Foreign Application Priority Data

Feb. 25, 2019 (JP) .............................. JP2019-032002

(51) Int. Cl.
*H01R 4/70* (2006.01)
*H01R 4/30* (2006.01)
*B60R 16/02* (2006.01)

(52) U.S. Cl.
CPC ................ *H01R 4/70* (2013.01); *H01R 4/30* (2013.01); *B60R 16/0215* (2013.01)

(58) Field of Classification Search
CPC ... H01R 4/30; H01R 4/70; H01R 9/11; H01R 11/00; H01R 13/44; H01R 13/64
USPC ....... 174/74 R, 78, 84 R; 439/680, 202, 501, 439/502, 503, 504, 505, 623, 624, 685, 439/754

See application file for complete search history.

(56) References Cited

U.S. PATENT DOCUMENTS

| | | | | |
|---|---|---|---|---|
| 3,956,576 A * | 5/1976 | Jensen | ................. | H01R 11/284 174/138 F |
| 4,562,125 A * | 12/1985 | Davis | ................. | H01M 50/571 429/65 |
| 5,295,860 A * | 3/1994 | Jozefczyk | ............. | H01R 27/02 439/503 |
| 6,533,619 B2 * | 3/2003 | Wakata | ................ | H01R 11/283 439/202 |
| 6,576,838 B2 * | 6/2003 | Matsumura | .......... | H01H 85/044 174/135 |

(Continued)

FOREIGN PATENT DOCUMENTS

| | | |
|---|---|---|
| EP | 2 400 593 A1 | 12/2011 |
| JP | H09-199188 A | 7/1997 |
| JP | 2003-178820 A | 6/2003 |

(Continued)

*Primary Examiner* — William H. Mayo, III
(74) *Attorney, Agent, or Firm* — Oliff PLC

(57) ABSTRACT

A terminal cover includes a lid and a cover body. The lid is rotatable around a hinge to open or close the cover body. An assembly of the cover body and the lid closed has a first side wall and a second side wall. A shoulder side wall that is at least one of the first and second side walls has a shoulder. The shoulder side wall is equipped with a first snap-fit and a second snap-fit. The first snap-fit is located closer to the hinge than the shoulder is, while the second snap-fit is located farther away from the hinge than the shoulder is. If the second snap-fit is undesirably unlocked, the shoulder serves to block transmission of resultant deflection of a portion of the shoulder side wall to the first snap-fit, thereby eliminating a risk that the first snap-fit may be accidently undone by the undesirable unlocking of the second snap-fit.

5 Claims, 7 Drawing Sheets

(56) References Cited

U.S. PATENT DOCUMENTS 8,338,710 B2 * 12/2012 Maguire ................ H02G 15/02
                                                                  174/135
10,347,878 B2 * 7/2019 Tsukiyoshi .......... H01M 50/172

FOREIGN PATENT DOCUMENTS

| JP | 4818034 B2 | 11/2011 |
| JP | 2020-136226 A | 8/2020 |

* cited by examiner

TERMINAL COVER

CROSS REFERENCE TO RELATED DOCUMENT

The present application claims the benefit of priority of Japanese Patent Application No. 2019-32002 filed on Feb. 25, 2019, the disclosure of which is incorporated herein by reference.

BACKGROUND

1 Technical Field

This disclosure relates generally to a terminal cover.

2 Background Art

There is known a resinous terminal cover shaped to electrically insulate and mechanically protect a metallic terminal to which an end of an electrical wire is connected and which is joined to an object using a bolt and a nut.

The terminal cover is equipped with a lid and a body. The lid has formed on a side wall thereof frame-shaped hooks which firmly engage protrusions on the body when the lid is closed. The lid has a pair of crimp-press leaf springs disposed on an inner ceiling wall thereof. The crimp-press leaf springs press and hold the terminal.

The hooks and the protrusions of the terminal cover are designed to achieve snap-fit joints using elasticity of the lid. In the following discussion, the frame-shaped hooks will also be referred to as engaging concavities. The protrusions will also be referred to as engaging convexities. A combination of one of the engaging concavities and a corresponding one of the convexities will also be referred to as a snap-fit assembly. The terminal cover disclosed in the above publication has the two snap-fit assemblies which are coplanar on the side wall thereof. The snap-fit assemblies are fastened to create a firm joint of the lid and the body of the terminal cover.

In recent years, terminal covers for use with electrical wires of electrical devices mounted in, for example, vehicles have been subject to restrictive mounting requirements because of electrification or complication of the structure of the vehicles and required to be reduced in size. Decreasing the size of the terminal cover in the above publication requires the two snap-fit assemblies to be arranged close to each other. If, however, one of the snap-fit assemblies is broken by an external pressure exerted thereon, it may result in transmission of deflection of the side wall of the terminal cover to the other snap-fit assembly, thereby leading to a risk of unintentional undoing of the other snap-fit assembly and insufficient reliability in fastening the snap-fit assemblies to mechanically join the lid and the cover together.

SUMMARY

It is, thus, an object of this disclosure to provide a terminal cover designed to improve stability in fastening a snap-fit assembly.

According to one aspect of this disclosure, there is provided a terminal cover which is made of resin and designed to electrically insulate and mechanically protect a metallic terminal which is joined to an object using a bolt and a nut. The terminal includes a bolt seat with a bolt hole, a wire connector connecting with an end of an electrical wire, and a body located between the bolt seat and the wire connector. The terminal cover includes a cover body, a hinge, and a lid. The cover body includes a curved portion and a base portion. The curved portion is of a semicircular shape and having an open hole formed to coincide with the bolt seat of the terminal. The base portion is arranged adjacent the curved portion and located in coincidence with the body of the terminal. The base portion including a bottom plate. The hinge is located on an opposite side of the base portion to the curved portion of the cover body and also has a rotation axis extending perpendicular to a reference plane defined to pass through the center of the open hole of the curved portion and extends between the curved portion and the base portion of the cover body. The lid is rotatable about the rotation axis of the hinge to open or close the cover body.

The cover body and the lid define a first side wall and a second side wall which are located on opposite sides of the reference plane. At least one of the first side wall and the second side wall has a plurality of snap-fits each of which includes a snap-in recessed portion formed on one of the cover body and the lid and a protrusion formed on other of the cover body and the lid. When the lid is closed, the protrusion is snap-fitted in the snap-fit recessed portion to achieve a joint of the lid and the cover body.

At least one of the first side wall and the second side wall is designed as a shoulder side wall which has a shoulder creating a stepwise change in distance between the one of the first side wall and the second side wall and the reference plane.

The snap-fits at least includes a first snap-fit and a second snap-fit arranged adjacent each other. The first snap fit is arranged closer to the hinge, while the second snap-fit is arranged farther away from the hinge.

If the second snap-fit is undesirably unlocked, the shoulder serves to block transmission of resultant deformation or deflection of a portion of the shoulder side wall to the first snap-fit, thereby eliminating a risk that the first snap-fit may be accidently undone by the undesirable unlocking of the second snap-fit, which improves the reliability of a joint between the lid and the cover body.

The shoulder side wall is preferably equipped with two snap-fit; the first and second snap fits, while the other side wall is preferably equipped with a single snap-fit located far away from the hinge.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Embodiments will be described below with reference to the drawings. The same reference numbers will refer to same or similar parts throughout the embodiments. A terminal cover which will be described below in each embodiment is made from resin and designed to electrically insulate and mechanically protect a metallic terminal to which an end of an electrical wire is connected and which is joined to an object using a bolt and a nut.

Figure 1:
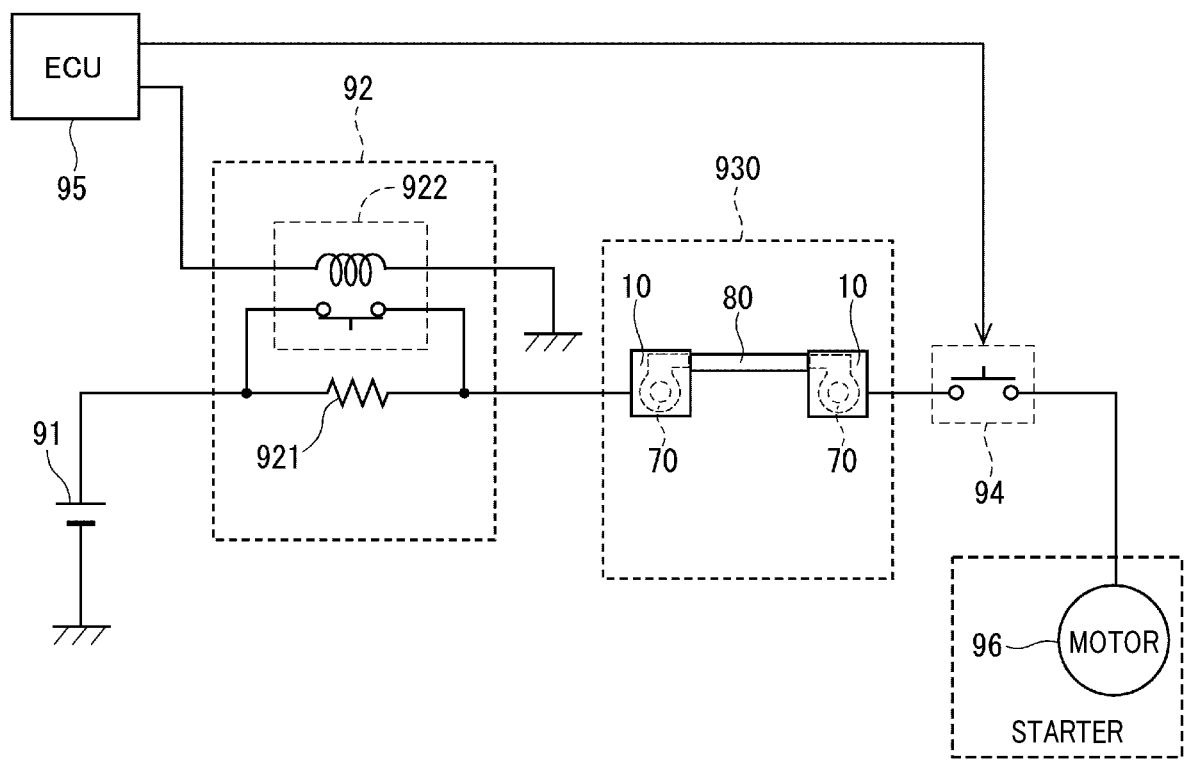
FIG. 1 is a circuit diagram which illustrates a power supply circuit for a starter with which terminal covers in each embodiment is used.

The terminal cover in this embodiment is used in, for example, a power supply circuit for an electrical motor of a starter mounted in a vehicle equipped with an idle-stop system. As illustrated in FIG. 1, the ICR (Inrush Current Reduction) relay 92 and the switch 94 are disposed between the battery 91 and the electrical motor 96.

The ICR relay 92 and the switch 94 are electrically connected by the terminal cover-wire subassembly 930. The terminal cover-wire subassembly 930 includes the electrical wire 80 and metallic terminals 70 joined to ends of the electrical wire 80. The terminals 70 are joined using a bolt and a nut, not shown, to terminals (i.e., target objects) of the ICR relay 92 and the switch 94, respectively. The resinous terminal covers 10 cover the terminals 70 to electrically insulate the terminals 70 and also protect the terminals 70 from mechanical impact.

Japanese Patent No. 4818034 discloses a terminal cover equipped with snap-fit assemblies which are arranged on a side wall of the terminal cover and fastened when a lid is closed, thereby achieving a firm joint of the lid and a body of the terminal cover. If, however, one of the two snap-fit assemblies arranged adjacent each other is broken by an external pressure exerted thereon, it may result in transmission of deflection of the side wall of the terminal cover to the other snap-fit assembly, thereby leading to a risk of unintentional undoing of the other snap-fit assembly and insufficient reliability in fastening the snap-fit assemblies to mechanically join the lid and the cover together.

The terminal cover in this embodiment are, therefore, designed to improve the reliability in fastening the snap-fit assemblies. The structure of the terminal cover will be described below in detail. Third digits of reference numbers used in the following embodiments for terminal covers indicate the numbers of the embodiments, respectively.

First Embodiment

Figure 2:
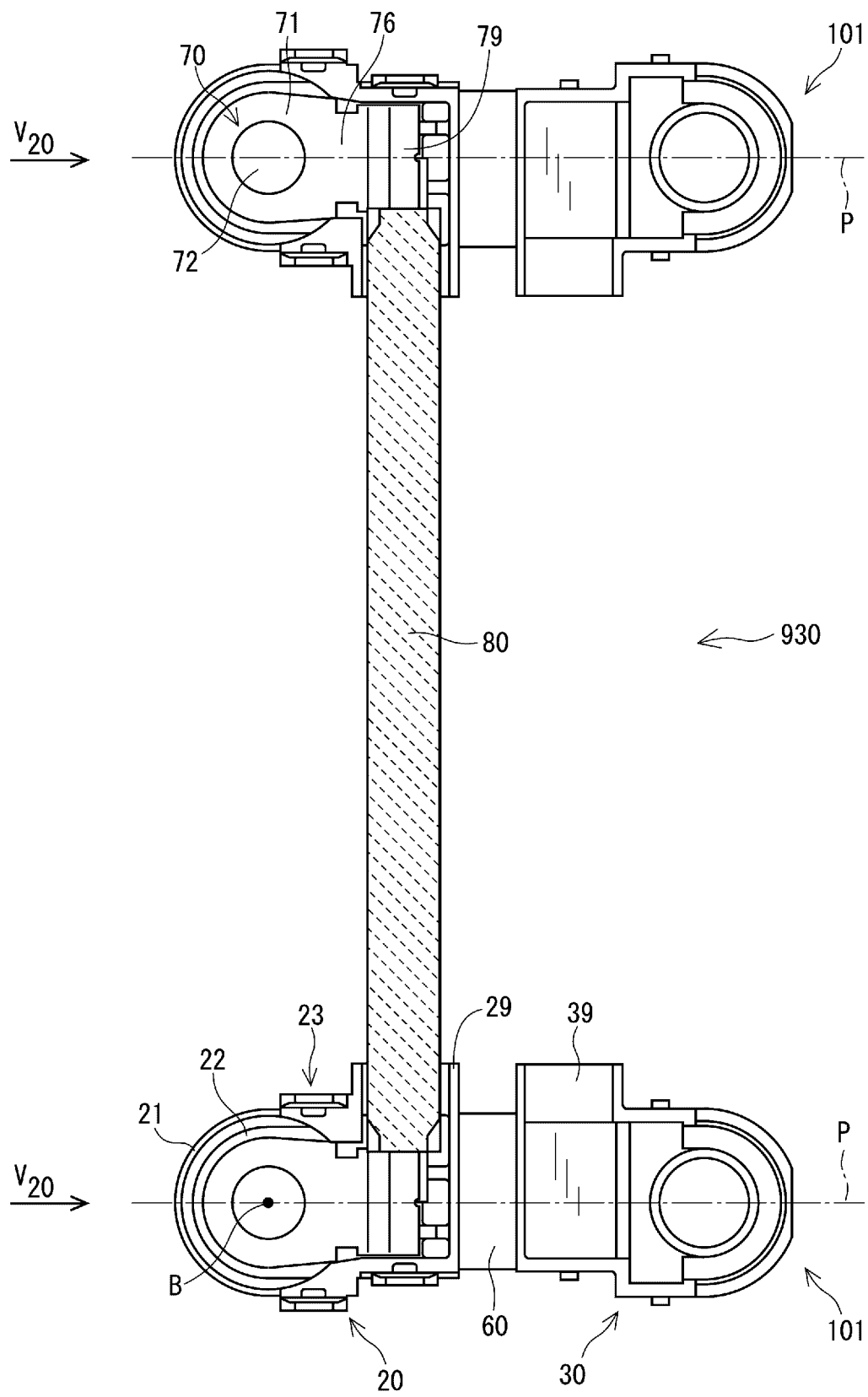
FIG. 2 is a plan view which illustrates a terminal cover-wire subassembly in the first embodiment.

The first embodiment will be described below with reference to FIGS. 2 to 5. FIG. 2 illustrates an entire structure of the terminal cover-wire subassembly 930 when the lid 30 is opened. In FIG. 2, the two terminal covers 101 are illustrated as being mounted on upper and lower ends of the electrical wire 80. An alternate long and short dash line extending horizontally through each of the terminal covers 101 represents an imaginary reference plane P whose definition will be discussed later in detail. Each of the terminal covers 101 in the first embodiment includes the wire retainer 29 which holds the electrical wire 80 so as to extend in a direction perpendicular to the reference plane P.

Specifically, when viewed in the direction $V_{20}$ in FIG. 2, an upper one of the terminal covers 101 (which will also be referred to below as an upper terminal cover) has the wire retainer 29 located on the right side of the reference plane P, while a lower one of the lower terminal covers 101 (which will also be referred to below as a lower terminal cover) has the terminal retainer 29 arranged on the left side of the reference plane P. In other words, the terminal covers 101 include a right terminal cover and a left terminal cover which have configurations bilaterally symmetrical with each other. For sake of simplicity of explanation, the following discussion will refer only to the lower terminal covers 101 illustrated in FIGS. 3(a), 3(b), 4(a), and 4(b).

Reference numbers on the upper side of FIG. 2 are mainly used to indicate parts of the terminal 70 attached to the upper terminal cover 101, while reference numbers on the lower side of the FIG. 2 mainly indicate parts of the lower terminal cover 101. Prior to reference to the structure of the terminal cover 101, the structure of the terminal 70 will be described below. The terminal 70 includes the bolt seat 71, the body 76, and the wire connector 79. The bolt seat 71 is of a substantially circular shape and has the bolt hole 72 formed in the center thereof. A bolt is inserted into the bolt hole 72 to connect the terminal 70 with a target object. The bolt seat 71 serves as a bearing surface for the head of the bolt or a nut. In other words, the bolt seat 72, as referred to herein, is used not only as a bolt seat, but also as a nut seat.

The body 76 is interposed between the bolt seat 71 and the wire connector 79. In the following discussion, a direction in which the bolt seat 71 and the body 76 are aligned with each other will also be referred to below as an axial direction of the terminal 70. Ideally, the axial direction of the terminal 70 coincides with the reference plane P. The wire connector 79 is joined to the electrical wire 80 by welding or pressure bonding.

Figure 3A:
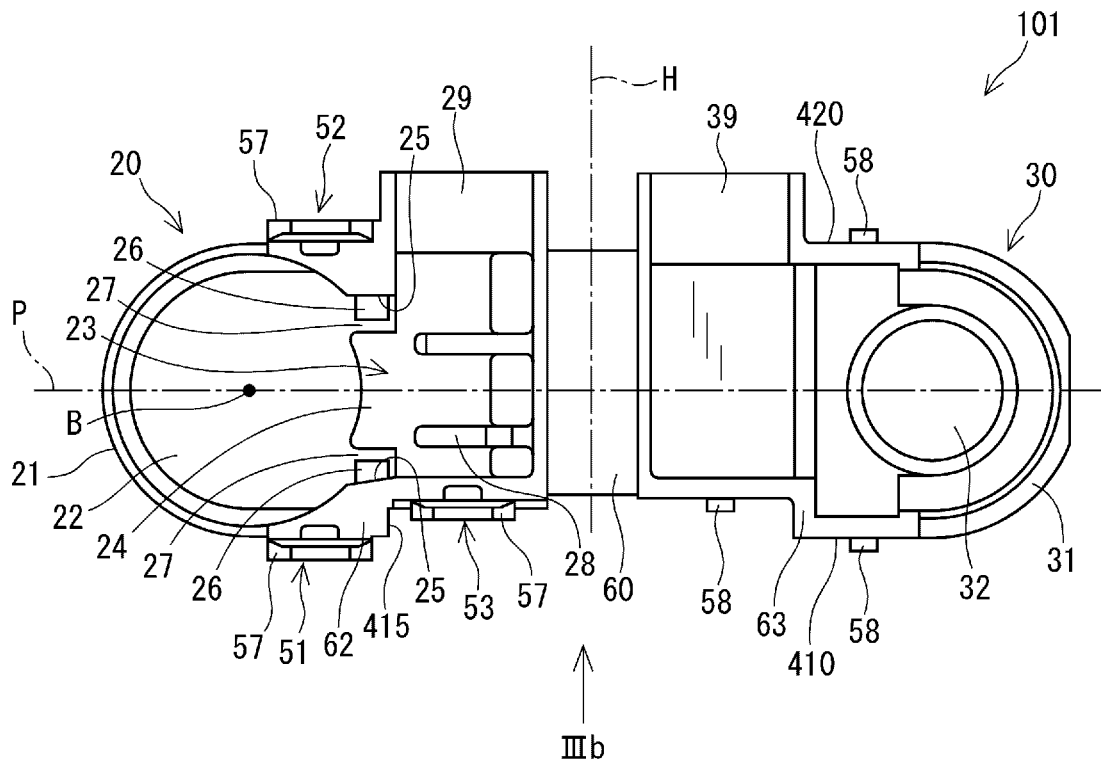
FIG. 3(a) is a plan view which illustrates a terminal cover when a lid is opened in the first embodiment.
Figure 3B:
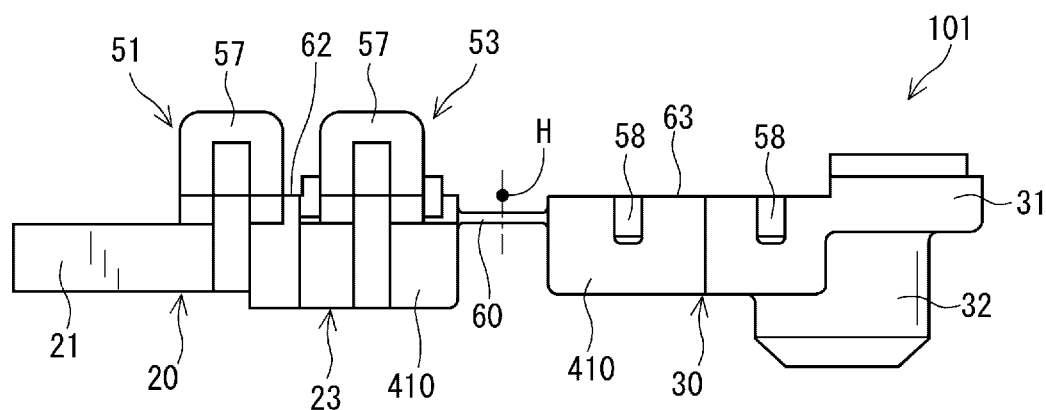
FIG. 3(b) is an illustration viewed in a direction IIIb in FIG. 3(a)
Figure 4A:
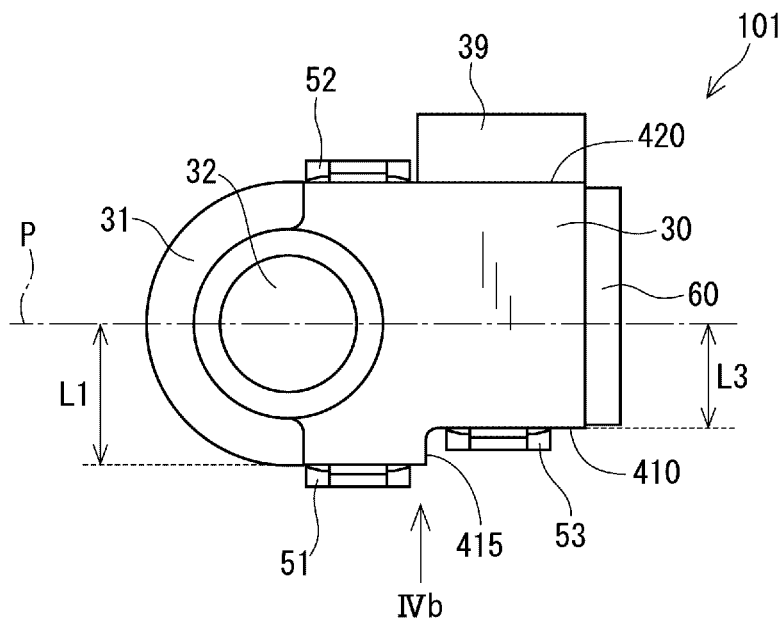
FIG. 4(a) is a plan view which illustrated a terminal cover when a lid is closed in the first embodiment.
Figure 4B:
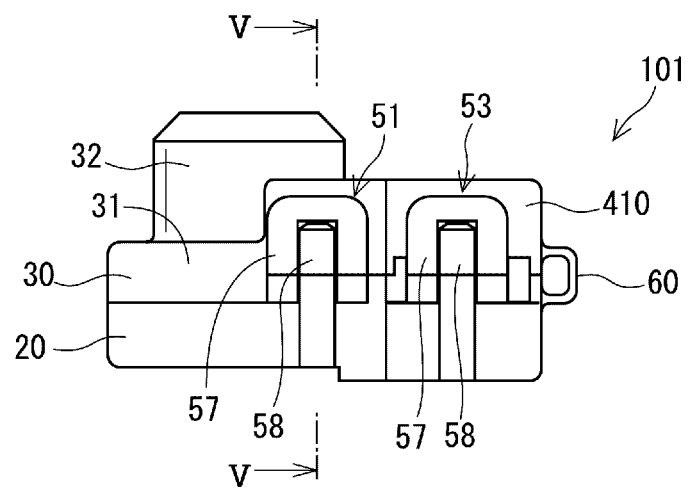
FIG. 4(b) is an illustration viewed in a direction IVb in FIG. 4(a)

The structure of the terminal cover 101 will be described with reference to FIG. 2 to FIG. 4(b). The terminal cover 101 includes the cover body 20, the lid 30, and the hinge 60. The lid 30 is rotatable about the rotation axis H of the hinge 60 to open or close the cover body 20. FIGS. 3(a) and 3(b) illustrate the lid 30 when opened. FIGS. 4(a) and 4(b) illustrate the lid 30 when closed. The terminal cover 101 is formed by a one-peace made from resin. Particularly, in a case of use in a starter for vehicles, PA66 (i.e., polyamide 66) which has a high heat resistance and a high mechanical strength may be preferably used as material of the terminal cover 101.

The cover body 20 includes the curved portion 21 and the base portion 23. The curved portion 21 is of a semi-circular shape and has the open hole 22 which substantially coincides with the bolt seat 71 of the terminal 70. The cover body 20 has a thin-walled portion around the open hole 22, so that the curved portion 21 is easily flexed. The base portion 23 is arranged adjacent the curved portion 21 and located in coincidence with the body 76 of the terminal 70. The base portion 32 includes the bottom plate 24. The base portion 23 having the bottom plate 24 is higher in rigidity than the curved portion 21. An imaginary plane which passes through the center B of the open hole 22 of the curved portion 21 and extends between the curved portion 21 and the base portion 23 is defined as the reference plane P.

The base portion 23 has two inner walls 25 which are opposed to each other through the reference plane P. Each of the inner walls 25 has the claw 26 formed thereon in the shape of a protrusion. The claws 26 face each other through the reference plane P and hold the body 76 of the terminal 70. Each of the inner walls 25 is isolated by the cut-out 27 from the bottom plate 24 of the base portion 23. The base portion 23 has the protrusion 28 which is located on an opposite side of the reference plane P to the wire retainer 29 and protrudes vertically from the bottom plate 24.

The hinge 60 has the rotation axis H which is located on the opposite side of the base portion 23 of the cover body 20 to the curved portion 21 of the cover body 20 and extends perpendicular to the reference plane P. The hinge 60 is shaped to have a thin wall and also has relatively large rounded bases. When the snap-fits 51, 52, and 53 which will be described later in detail are released or unlocked, the elasticity of the hinge 60 will function to open the lid 30 over 90° to the cover body 20.

The configuration of the lid 30 is basically contoured to conform with that of the cover body 20. Specifically, the lid 30 includes the semicircular portion 31 contoured to conform with the curved portion 21 of the cover body 20. When the lid 30 is closed, the cylinder 32 of the lid 30 covers above the open hole 22 and houses the head of the bolt therein. The lid 30 also has the electric wire retainer 39 which retains therein the electrical wire 80 joined to the wire connector 79 of the terminal 70 together with the wire retainer 29 of the cover body 20.

When the lid 30 is closed, the end surface 62 of the cover body 20 will face the end surface 63 of the lid 30. When the cover body 20 is placed to face the lid 30 in such a way, the terminal cover 101 will have a side wall which is located on the opposite side of the reference plane P to the wire retainer 29 and will also be referred to below as the first side wall 410. Additionally, the terminal cover 101 will also have a side wall which is located on the same side of the reference plane P as the wire retainer 29 and will also be referred to below as the second side wall 420. In other words, the first side wall 410 and the second side wall 420 are arranged on the opposite sides of the reference plane P. The first side wall 410 has the shoulder 415 which is geometrically shaped to create a stepwise change in distance between the first side wall 410 and the reference plane P.

The terminal cover 101 is equipped with two snap-fits 51 and 53 on the first side wall 410 and a single snap-fit 52 on the second side wall 420. Each of the snap-fits 51, 52, and 53 is made up of the snap-in recessed portion 57 formed in the cover body 20 and the protrusion 58 formed on the lid 30.

The snap-in recessed portion 57 is of a frame shape with a rectangular opening. Specifically, the snap-in recessed portion 57 includes a frame extending from the side wall 410 or 420 of the cover body 20 over the end surface 62 away from the bottom plate 24. The protrusion 58 projects from the side wall 410 or 420 of the lid 30. The outline of the protrusion 58 is of a rectangular shape as viewed from outside the side wall 410 or 420 and fit in the rectangular opening of the snap-in recessed portion 57. When the lid 30 is closed, the snap-in recessed portion 57 is snap-fitted on the protrusion 58, thereby causing the lid 30 to be kept closed against the elasticity of the hinge 60.

The structures of the side walls 410 and 420 and the snap-fits 51, 52, and 53 will be described below in detail. In the above described first embodiment, the first side wall 410 has the shoulder 415. In the following discussion, a side wall with a shoulder will also be referred to as a shoulder side wall. In the first embodiment, the first side wall 410 is designed as the shoulder side wall.

In the following discussion, a region closer to the hinge 60 than the shoulder 415 is will be referred to below as a hinge side, while the opposite side will be referred to below as a far-hinge side. In the first embodiment the snap fit 53 on the hinge side is located inside the snap-fit 51 on the far-hinge side in the width-wise direction of the terminal cover 101. In other words, the distance L3, as illustrated in FIG. 4(a), between a portion of the first side wall 410 which is located closer to the hinge 60 than the shoulder 415 is, that is, on the hinge side and the reference plane P is set shorter than the distance L1 between a portion of the first side wall 410 which is located farther away from the hinge 60 than the shoulder 415 is, that is, on the far-hinge side and the reference plane P.

The first side wall 410 has the snap-fit 51 arranged farther away from the hinge 60 than the shoulder 415 is and the snap-fit 53 arranged closer to the hinge 60 than the shoulder 415 is. In other words, the first side wall 410 is equipped with the snap-fits 51 and 53 disposed adjacent each other on the opposite sides of the shoulder 415. The second side wall 420 has the snap-fit 52 located on the opposite side of the reference plane P to the snap-fit 51 of the first side wall 410. In other words, the snap-fits 51 and 52 are arranged symmetrically with respect to the reference plane P. As apparent from the above discussion, each of the terminal covers 101 is equipped with a total of three snap-fits 51, 52, and 53 on the first side wall 410 and the second side wall 420. The snap-fit 53 which is located closest to the hinge 60 is provided only on the first side wall 410. In the following discussion, at least one of the snap-fits 51, 52, and 53 which is located closer to the hinge 60 will also be referred to as a first snap-fit, while at least one of the snap-fits 51, 52, and 53 which is located farther away from the hinge 60 will also be referred to as a second snap-fit.

How to achieve snap-fit joining of the lid 30 and the cover body 20 using the snap-fit recessed portions 57 and the protrusions 58 will be described below prior to discussion of beneficial advantages of the first embodiment. The snap-fit joint of the lid 30 and the cover body 20 is established by fastening the snap-in recessed portion 72 on the protrusion 58 using the elasticity of the snap-in recessed portion 57 or the side wall 410 or 420. The snap-fit joint is released by disengaging the snap-in recessed portion 72 from the protrusion 58. The snap-fit joint may be achieved repeatedly.

Figure 5:
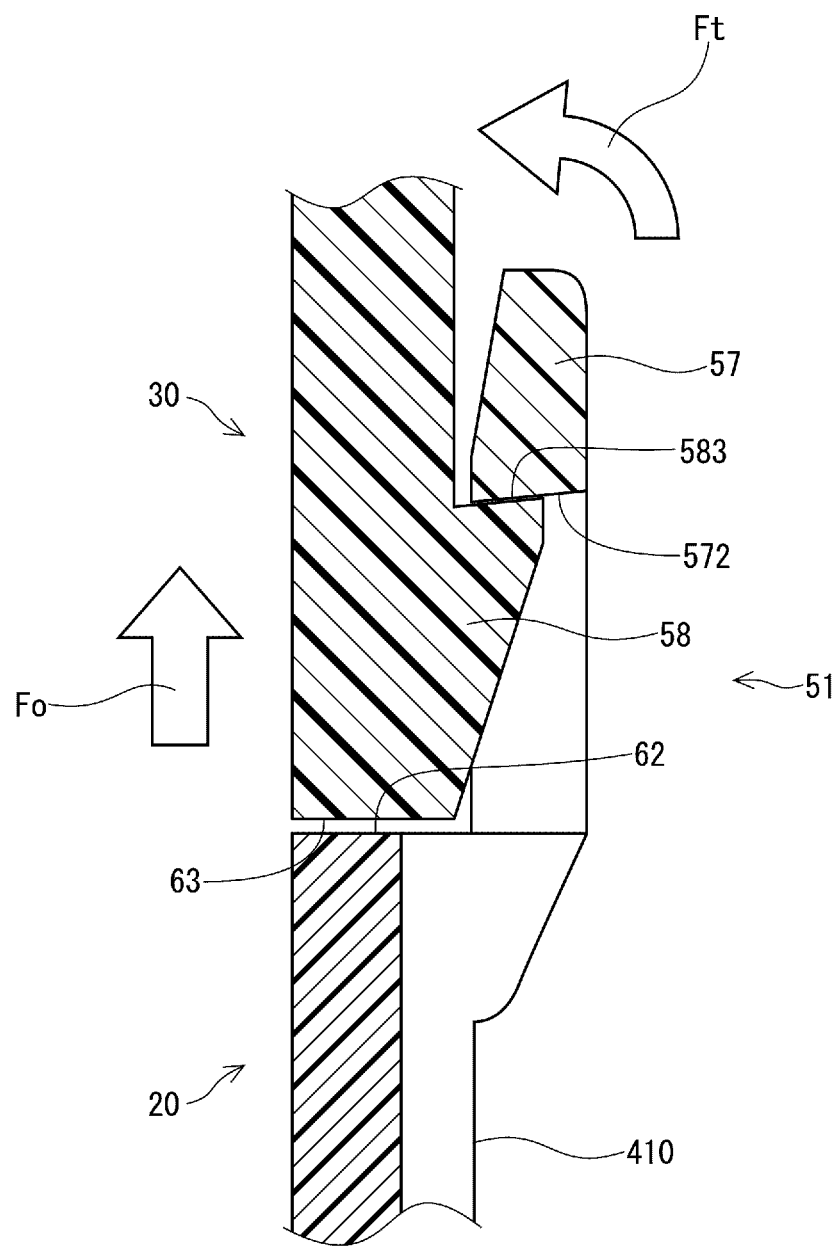
FIG. 5 is a partially enlarged view taken along the line V-V in FIG. 4(b)

Referring to FIG. 5 which is an enlarged sectional view of the snap-fit 51, when the lid 30 is closed in the snap-fit manner, the force $F_o$ is produced by elasticity of the hinge 60 and exerted on the lid 30 to urge the lid 30 to an open state. The opening force $F_o$ presses the upper surface 538 of the protrusion 58 into constant contact with the lower surface 572 of the snap-in recessed portion 57, thereby generating the fastening force Ft to achieve a firm joint of the lid 30 and the cover body 20.

A conventional structure, like that taught in the above discussed Japanese Patent No. 4818034, in which a plurality of snap-fits are arranged adjacent each other on a single side wall will be considered. When one of the snap-fits is unlocked, it may result in elastic deformation of the side wall which is then propagated to the adjacent snap-fit, so that it may be undesirably undone. The degree of such deformation of the side wall becomes higher farther away from the hinge. The structure in the first embodiment, however, offers the following beneficial advantages.

BENEFICIAL ADVANTAGES

A) The terminal cover 101 in the first embodiment is equipped with two snap-fits 51 and 53 on the first side wall 410 designed as the shoulder side wall and a single snap-fit 52 on the second side wall 420. The snap-fits 51 and 53 are located adjacent each other on the opposite sides of the shoulder 415 on the first side wall 410.

The shoulder 415 of the first side wall 410 functions to reduce transmission of deformation or deflection of a portion of the first side wall 410 occurring on one side of the shoulder 415 to a portion of the first side wall 410 on the other side of the shoulder 415. A clearance between the lid 30 and the cover body 20 when the snap-fits 51, 52, and 53 are unlocked becomes smaller toward the hinge 60. Therefore, when the snap-fit 51 farther away from the shoulder 415 is unlocked, an effect of the unlocking motion of the snap-fit 51 becomes small on the snap-fit 53 closer to the hinge 60.

A portion of the first side wall 410 on which the snap-fit 51 farther away from the hinge 60 is formed is easy to deform because it is located near the curved portion 21 which has a low rigidity. This is advantageous in terms of ease of locking or unlocking of the snap-fit 51. In other words, the snap-fit 53 located closer to the hinge 60 is designed to be firmly locked, while the snap-fit 51 located farther away from the hinge 60 is designed to be relatively easy to unlock.

As apparent form the above discussion, the terminal cover 101 in this embodiment is designed to have a plurality of snap-fits which are different in mechanical property from each other and arranged on opposite side of a shoulder on a single wall, thereby reducing an effect of unlocking of one of the snap-fits arranged farther away from a hinge on the adjacent snap-fit closer to the hinge. This minimizes a risk that one of the snap-fit is undesirably unlocked and ensures the reliability of fastening of the snap-fits.

B) The snap-fits 51, 52, and 53 are arranged on the first side wall 410 and the second side wall 420 which are opposed to each other in the width-wise direction of the terminal cover 101, thereby improving the reliability of joining of the lid 30 and the body 40.

C) The snap-fit 53 located closest to the hinge 60 is formed only on the first side wall 410. The closer the snap-fit 53 is arranged to the hinge 60, the smaller the degree to which the lid 30 is opened when the snap-fit 51 or 52 is unlocked or the amount of elastic deformation of the side wall 410 or 420 when the snap-fits 51 or 52 is undone. The snap-fit 53 closest to the hinge 60 is, therefore, less subjected to deformation or deflection of the first side wall 410 or the second side wall 420 upon unlocking of the snap-fit 51 or 52, thereby ensuring the stability of fastening of the snap-fit 53.

The second side wall 420 has a portion which is located closest to the hinge 60 and shaped as the wire retainers 29 and 39. It is, therefore, impossible to have a snap-fit formed on the portion of the second side wall 420 closest to the hinge 60. The first side wall 410 is, therefore, designed to have the snap-fit 53 disposed closest to the hinge 60, thereby ensuring the reliability in joining the lid 30 and the cover body 20 regardless of restrictions to the layout of the snap-fits 51, 52, and 53.

D) The first side wall 410 is designed as the shoulder side wall equipped with two snap-fits 51 and 53, while the second side wall 420 has only the snap-fit 52 located symmetrically to the snap-fit 51 on the first side wall 410 with respect to the reference plane P. This layout is most effective in arranging three snap-fits: the snap-fits 51, 52, and 53 on the terminal cover 101.

In other words, the above layout of the snap-fits 51, 52, and 53 serves to reduce an effect of the unlocking motion of the snap-fit 51 or 52 on the snap-fit 53 which is located closer to the hinge 60 than the shoulder 415 is and closest to the hinge 60 among the snap-fits 51 to 53, thereby ensuring the stability of locking of the snap-fit 53. This also enables the snap-fits 51 and 52 to be arranged as far away from the hinge 60 as possible.

The snap-fits 51 and 52 are symmetrically with respect to the reference plane P on the far hinge side are easy to unlock, thereby improving an effort in opening the lid 30. The above described layout of three snap-fits: the snap-fits 51, 52, and 53, therefore, improves the reliability in fastening the snap-fits 51, 52, and 53 and also facilitates opening of the lid 30.

E) The distance L3 between a portion of the first side wall 410 which is located closer to the hinge 60 than the shoulder 415 is and the reference plane P is set shorter than the distance L1 between a portion of the first side wall 410 which is located farther away from the hinge 60 than the shoulder 415 is and reference plane P. This enables the size of the terminal cover 101 to be reduced as compared with when the distance L3 is longer than the distance L1.

Next, the second to sixth embodiments which are different in number or layout of snap-fits from the first embodiment will be described below with reference to FIG. 6(a) to FIG. 7(c). Reference numbers for snap-fits and a shoulder in the second to sixth embodiments will not be used in claims.

Second and Third Embodiments

Figure 6A:
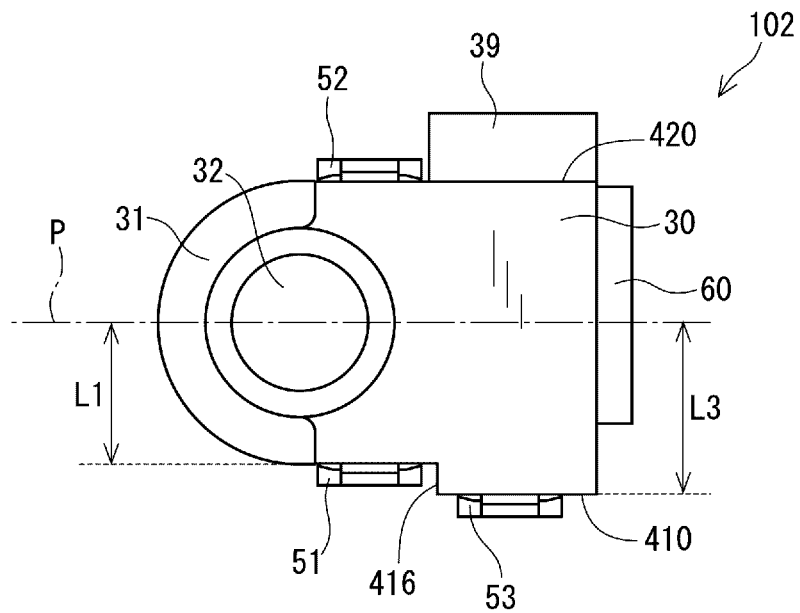
FIG. 6(a) is a plan view which illustrates a terminal cover when a lid is closed in the second embodiment.

FIG. 6(a) illustrates the terminal cover 102 in the second embodiment. The first side wall 410 of the terminal cover 102 has the shoulder 416 which is different in orientation thereof from that in the first embodiment. Additionally, the snap-fit 53 closer to the hinge 60 is located outside the snap-fit 51 farther away from the hinge 60 in the width-wise direction of the terminal cover 102. In other words, the distance L3 between a portion of the first side wall 410 which is located closer to the hinge 60 than the shoulder 416 is and the reference plane P is set longer than the distance L1 between a portion of the first side wall 410 which is located farther away from the hinge 60 than the shoulder 416 is and reference plane P. The structure of the terminal cover 102 in the second embodiment also offers the above described beneficial advantages A) to D).

Figure 6B:
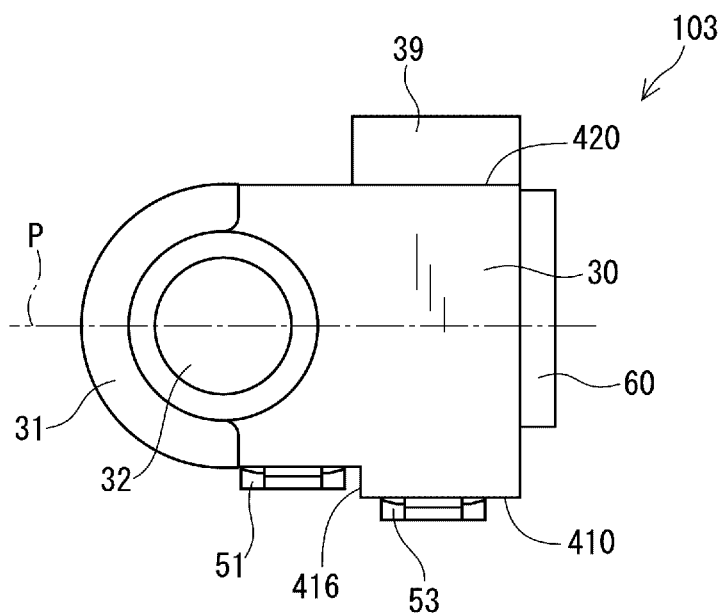
FIG. 6(b) is a plan view which illustrates a terminal cover when a lid is closed in the third embodiment.

FIG. 6(b) illustrates the terminal cover 103 in the third embodiment which is a modification of the terminal cover 102 in FIG. 6(a). Specifically, the terminal cover 103 is equipped with two snap-fits 51 and 53 only on the first side wall 410. In other words, the second side wall 420 has no snap-fit. Other arrangements are identical with those in the third embodiment, and explanation thereof in detail will be omitted here. The structure of the terminal cover 103 in the third embodiment also offers the above described beneficial advantages A) and C).

Fourth and Fifth Embodiments

Figure 7A:
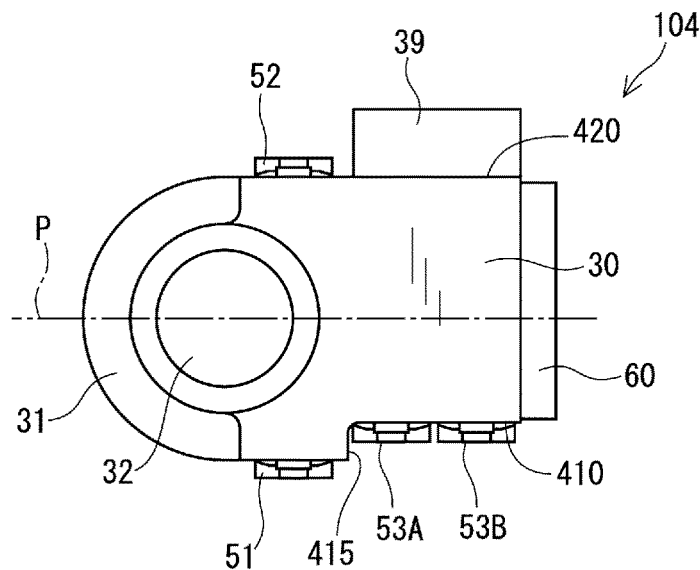
FIG. 7(a) is a plan view which illustrates a terminal cover when a lid is closed in the fourth embodiment.

FIG. 7(a) illustrates the terminal cover 104 in the fourth embodiment which is a modification of the terminal cover 101 in the first embodiment. Specifically, the terminal cover 104 is equipped with two snap-fits 53A and 53B disposed closer to the hinge 60 than the shoulder 415 is on the first side wall 410. The snap-fits 53A and 53B are arranged adjacent each other in the longitudinal direction of the terminal cover 104. Other arrangements are identical with those in the first embodiment, and explanation thereof in detail will be omitted here.

Figure 7B:
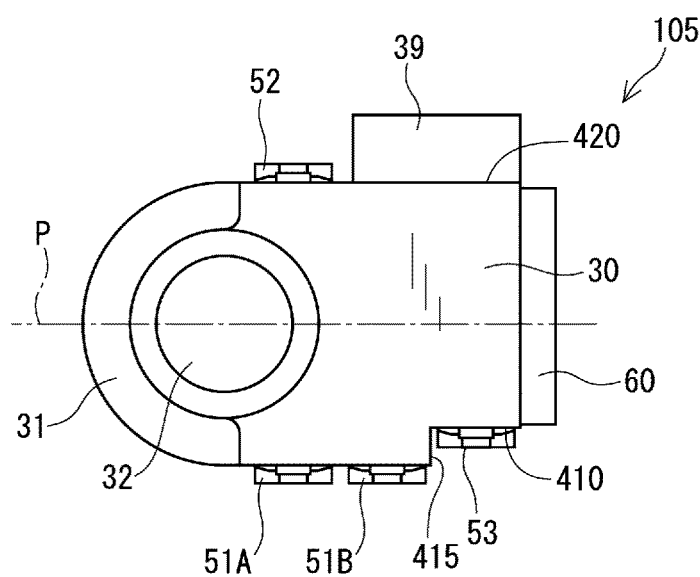
FIG. 7(b) is a plan view which illustrates a terminal cover when a lid is closed in the fifth embodiment.

FIG. 7(b) illustrates the terminal cover 105 in the fifth embodiment which is a modification of the terminal cover 101 in the first embodiment. Specifically, the terminal cover 105 is equipped with two snap-fits 51A and 51B disposed farther away from the shoulder 415 than the hinge 60 is on the first side wall 410. Other arrangements are identical with those in the first embodiment, and explanation thereof in detail will be omitted here.

As apparent from the above discussion, the terminal covers 104 and 105 in the fourth and fifth embodiments are each equipped with a total of four snap-fits: three on the first side wall 410, and one on the second side wall 420. The structures of the terminal covers 104 and 105 in the fourth and fifth embodiments offers the above described beneficial advantages A) to E).

Sixth Embodiment

Figure 7C:
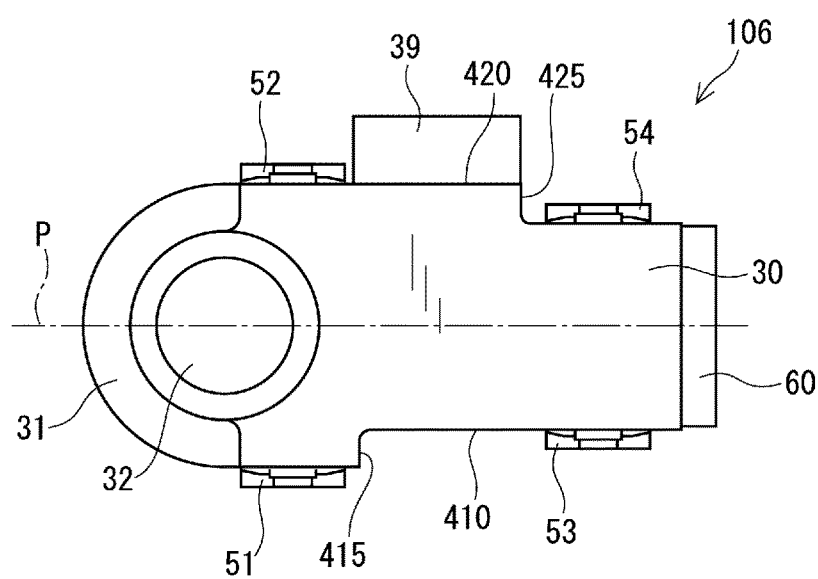
FIG. 7(c) is a plan view which illustrates a terminal cover when a lid is closed in the sixth embodiment.

FIG. 7(c) illustrates the terminal cover 106 in the sixth embodiment which is a modification of the terminal cover 101 in the first embodiment. The terminal cover 106 is shaped to have an increased size of space between the electric wire retainer 39 and the hinge 60 and also has the shoulder 425 formed on the second side wall 420. The first side wall 410 and the second side wall 420 are, therefore, both designed as shoulder side walls. In the increased space, the snap-fits 53 and 54 are arranged closer to the hinge 60 than the shoulders 415 and 425 are on the first side wall 410 and the second side wall 420, respectively. The terminal cover 106 is, therefore, equipped with a total of four snap-fits: two on the first side wall 410, and two on the second side wall 420.

As apparent from the above discussion, the terminal cover 106 has two snap-fits arranged on the opposite sides of each of the shoulders 415 and 425 on the side walls 410 and 420. Such two snap-fits are locates away from each other across the shoulder 415 or 425. This layout minimizes a risk that if one of the two snap-fits is accidentally unfastened, an undesirable effect of such an event, e.g., deflection of the side wall 415 or 425 may act on the other snap-fit, thereby improving the reliability of joining the lid 30 and the cover body 20 together.

OTHER EMBODIMENTS

Each of the snap-fits 51, 52, 53, 51A, 51B, 53A, and 53B described in the above embodiments includes the snap-in recessed portion 57 formed on the cover body 20 and the protrusion 58 formed on the lid 30, but however, it may alternatively be designed to have the snap-in recessed portion 57 formed on the lid 30 and the protrusion 58 formed on the cover body 20. Each of the snap-fits 51, 52, 53, 51A, 51B, 53A, and 53B is, as apparent from the above discussion, designed as a cantilever type, but however, may alternatively be engineered to be of another type, such as so-called annular or torsional. Each of the snap-in recessed portion 57 and the protrusion 58 may also be designed in another snap-fit shape.

The terminal covers 101, 102, 103, 104, 105, and 106 may also be used for wire connection other than that in the power supply circuit for the starter motor.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A terminal cover which is made of resin and designed to electrically insulate and mechanically protect a metallic terminal which is joined to an object using a bolt and a nut and includes a bolt seat with a bolt hole, a wire connector connecting with an end of an electrical wire, and a body located between the bolt seat and the wire connector, comprising:
   a cover body which includes a curved portion and a base portion, the curved portion being of a semicircular shape and having an open hole formed to coincide with the bolt seat of the terminal, the base portion being arranged adjacent the curved portion and located in coincidence with the body of the terminal, the base portion including a bottom plate;
   a hinge which is located on an opposite side of the base portion to the curved portion of the cover body and also has a rotation axis extending perpendicular to a reference plane defined to pass through a center of the open hole of the curved portion and extends between the curved portion and the base portion of the cover body; and
   a lid which is rotatable about the rotation axis of the hinge to open or close the cover body,
   wherein the cover body and the lid define a first side wall and a second side wall which are located on opposite sides of the reference plane,
   wherein at least one of the first side wall and the second side wall has a plurality of snap-fits each of which includes a snap-in recessed portion formed on one of the cover body and the lid and a protrusion formed on other of the cover body and the lid, when the lid is closed, the protrusion being snap-fitted in the snap-fit recessed portion to achieve a joint of the lid and the cover body,
   wherein at least one of the first side wall and the second side wall is designed as a shoulder side wall which has a shoulder creating a stepwise change in distance between the one of the first side wall and the second side wall and the reference plane,
   wherein the snap-fits at least includes a first snap-fit and a second snap-fit arranged adjacent each other on a same side of the at least one of the first side wall and the second side wall, the first snap fit being arranged closer to the hinge, the second snap-fit being arranged farther away from the hinge, and
   wherein the shoulder is located between the first snap-fit and the second snap-fit.

2. The terminal cover as set forth in claim 1, wherein each of the first side wall and the second side wall has at least one of the snap-fits.

3. The terminal cover as set forth in claim 1, wherein one of the snap-fits which is located closest to the hinge is provided on only one of the first side wall and the second side wall.

4. The terminal cover as set forth in claim 2, wherein one of the first side wall and the second side wall is designed as the shoulder side wall which has the first and second snap-fits, and wherein other of the first side wall and the second side wall has one of the snap-fits which is located symmetrically with respect to the reference plane to the first snap-fit arranged far away from the hinge on the shoulder side wall.

5. The terminal cover as set forth in claim 1, wherein the shoulder side wall is shaped so that a distance between a portion of the shoulder side wall which is located closer to the hinge than the shoulder is and the reference plane is set shorter than a distance between a portion of the shoulder side wall which is located farther away from the hinge than the shoulder is and the reference plane.

* * * * *